United States Patent
Oda

(10) Patent No.: US 11,002,204 B2
(45) Date of Patent: May 11, 2021

(54) EXHAUST PURIFICATION SYSTEM OF INTERNAL COMBUSTION ENGINE AND EXHAUST PURIFICATION METHOD

(71) Applicant: TOYOTA JIDOSHA KABUSHIKI KAISHA, Toyota (JP)

(72) Inventor: Tomihisa Oda, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 16/449,854

(22) Filed: Jun. 24, 2019

(65) Prior Publication Data

US 2020/0063679 A1 Feb. 27, 2020

(30) Foreign Application Priority Data

Aug. 23, 2018 (JP) .............................. JP2018-156652

(51) Int. Cl.
*F01N 9/00* (2006.01)
*F02D 41/02* (2006.01)
(Continued)

(52) U.S. Cl.
CPC ....... *F02D 41/0235* (2013.01); *F01N 3/0835* (2013.01); *F01N 3/0842* (2013.01);
(Continued)

(58) Field of Classification Search
CPC ............. F02D 41/0235; F02D 41/1441; F01N 3/0871; F01N 3/0835; F01N 3/0842;
(Continued)

(56) References Cited

U.S. PATENT DOCUMENTS 5,657,625 A * 8/1997 Koga ........................ F01N 3/20
60/274
5,662,869 A * 9/1997 Abe ....................... F01N 3/2006
422/171
(Continued)

FOREIGN PATENT DOCUMENTS

| DE | 102004012272 A1 | 9/2004 |
| JP | 2008-163878 A | 7/2008 |
| WO | 0027508 A1 | 5/2000 |

*Primary Examiner* — Matthew T Largi
(74) *Attorney, Agent, or Firm* — Oliff PLC

(57) ABSTRACT

An exhaust purification system of an internal combustion engine comprises an HC adsorbent 20 arranged adsorbing HC in exhaust gas, an NOx adsorbent 20 adsorbing NOx in exhaust gas, a catalyst 24 removing HC and NOx at a predetermined air-fuel ratio, an air-fuel ratio control part 31 configured to control an air-fuel ratio of exhaust gas, and an HC concentration calculating part 32 configured to calculate a concentration of HC desorbed from the HC adsorbent. A peak of a desorption temperature of HC at the HC adsorbent and a peak of a desorption temperature of NOx at the NOx adsorbent are substantially the same. The air-fuel ratio control part is configured to control an air-fuel ratio of inflowing exhaust gas flowing into the catalyst to the predetermined air-fuel ratio based on the concentration of HC calculated by the HC concentration calculating part when HC is desorbed from the HC adsorbent.

18 Claims, 9 Drawing Sheets

(51) Int. Cl.
  *F01N 3/08* (2006.01)
  *F02D 41/14* (2006.01)
  *F01N 3/22* (2006.01)

(52) U.S. Cl.
  CPC ........... *F01N 3/0871* (2013.01); *F01N 9/005* (2013.01); *F02D 41/1441* (2013.01); *F01N 3/22* (2013.01)

(58) Field of Classification Search
  CPC ........ F01N 9/005; F01N 3/22; F01N 2240/16; F01N 3/0807; F01N 2240/18
  See application file for complete search history.

(56) References Cited

U.S. PATENT DOCUMENTS

| | | | | |
|---|---|---|---|---|
| 5,884,473 | A * | 3/1999 | Noda | B01J 23/58 60/274 |
| 2002/0148218 | A1 * | 10/2002 | Hertzberg | F01N 13/009 60/285 |
| 2003/0093992 | A1 * | 5/2003 | Suga | B01D 53/9454 60/285 |
| 2005/0220679 | A1 * | 10/2005 | Choi | F01N 3/0835 422/177 |
| 2010/0058742 | A1 | 3/2010 | Hirata et al. | |
| 2010/0199635 | A1 * | 8/2010 | Akama | F01N 11/007 60/274 |

* cited by examiner

EXHAUST PURIFICATION SYSTEM OF INTERNAL COMBUSTION ENGINE AND EXHAUST PURIFICATION METHOD

FIELD

The present invention relates to an exhaust purification system of an internal combustion engine and exhaust purification method.

BACKGROUND

It has been known in the past to provide a catalyst for removing harmful substances in exhaust gas in an exhaust passage of an internal combustion engine so as to keep harmful substances from being discharged into the atmosphere. However, when the temperature of the exhaust gas is low such as at the time of cold start of the internal combustion engine, the catalyst becomes deactivated and the exhaust purification performance of the catalyst falls.

In the exhaust gas purification system described in PTL 1, the catalyst is provided with an HC adsorbent for adsorbing HO and an NOx adsorbent for adsorbing NOx. In such an exhaust gas purification system, the desorption start temperature of HC and the desorption start temperature of NOx are the same and the NOx is removed at the catalyst by the HC as a reducing agent.

CITATION LIST

Patent Literature

[PTL 1] Japanese Unexamined. Patent Publication No. 2008-163878

SUMMARY

Technical Problem

However, in the exhaust gas purification system described in PTL 1, the amount of HC desorbed from the HC adsorbent and fed to the catalyst is not considered at all. For this reason, in the catalyst, the HO and NOx are not effectively removed and the exhaust emissions are liable to deteriorate.

Therefore, in view of the above technical problem, an object of the present invention is to keep the exhaust emissions from deteriorating when and NOx flow out from an adsorbent placed in an exhaust passage of an internal combustion engine.

Solution to Problem

The summary of the present disclosure is as follows.

(1) An exhaust purification system of an internal combustion engine comprising an HC adsorbent arranged in an exhaust passage of an internal combustion engine and adsorbing HC in exhaust gas, an NOx adsorbent arranged in the exhaust passage and adsorbing NOx in exhaust gas, a catalyst arranged in the exhaust passage at a downstream side from the HC adsorbent and the NOx adsorbent in a direction of exhaust flow and removing HC and NOx at a predetermined air-fuel ratio, an air-fuel ratio control part configured to control an air-fuel ratio of exhaust gas, and an HC concentration calculating part configured to calculate a concentration of HC desorbed from the HC adsorbent, wherein a peak of a desorption temperature of HC at the HC adsorbent and a peak of a desorption temperature of NOx at the NOx adsorbent are substantially the same, and the air-fuel ratio control part is configured to control an air-fuel ratio of inflowing exhaust gas flowing into the catalyst to the predetermined air-fuel ratio based on the concentration of HC calculated by the HC concentration calculating part when HC is desorbed from the HC adsorbent.

(2) The exhaust purification system of an internal combustion engine described in above (1), further comprising an adsorbent heating device heating the HC adsorbent and an adsorbent heating part configured to control the adsorbent heating device, wherein the adsorbent heating part is configured to maintain a temperature of the HC adsorbent at a vicinity of the desorption temperature of HC by the adsorbent heating device when the air-fuel ratio control part controls the air-fuel ratio of exhaust gas to the predetermined air-fuel ratio based on the concentration of HC calculated by the HC concentration calculating part.

(3) The exhaust purification system of an internal combustion engine described in above (1) or (2), further comprising an air feed device feeding air to the exhaust passage at an upstream side from the catalyst in the direction of exhaust flow, the air-fuel ratio control part is configured to use the air-feed device to control the air-fuel ratio of inflowing exhaust gas to the predetermined air-fuel ratio based on the concentration of HC calculated by the HC concentration calculating part.

(4) The exhaust purification system of an internal combustion engine described in any one of above (1) to (3), wherein the catalyst is a three-way catalyst, and the air-fuel ratio control part is configured to control an air-fuel ratio of exhaust gas exhausted from an engine body of the internal combustion engine to a stoichiometric air-fuel ratio when an amount of adsorption of HC at the HC adsorbent is equal to or less than a predetermined HC reference amount and an amount of adsorption of NOx at the NOx adsorbent is greater than a predetermined NOx reference amount.

(5) The exhaust purification system of an internal combustion engine described in any one of above (1) to (4), wherein the catalyst is a three-way catalyst, and the air-fuel ratio control part is configured to control an air-fuel ratio of exhaust gas exhausted from an engine body of the internal combustion engine to leaner than a stoichiometric air-fuel ratio when an amount of adsorption of HC at the HC adsorbent is greater than a predetermined HC reference amount and an amount of adsorption of NOx at the NOx adsorbent is equal to or less than a predetermined NOx reference amount.

(6) An exhaust purification method using an HC adsorbent arranged in an exhaust passage of an internal combustion engine and adsorbing HC in exhaust gas, an NOx adsorbent arranged in the exhaust passage and adsorbing NOx in exhaust gas, and a catalyst arranged in the exhaust passage at a downstream side from the HC adsorbent and the NOx adsorbent in a direction of exhaust flow and removing HC and NOx at a predetermined air-fuel ratio, comprising controlling an air-fuel ratio of exhaust gas flowing into the catalyst to the predetermined air-fuel ratio based on a concentration of HC desorbed from the HC adsorbent when HC is desorbed from the HC adsorbent, wherein a peak of a desorption temperature of HC at the HC adsorbent and a peak of a desorption temperature of NOx at the NOx adsorbent are substantially the same.

Advantageous Effects of Invention

According to the present invention, it is possible to keep the exhaust emissions from deteriorating when HC and NOx flow out from an adsorbent placed in an exhaust passage of an internal combustion engine.

DESCRIPTION OF EMBODIMENTS

Figure 1:
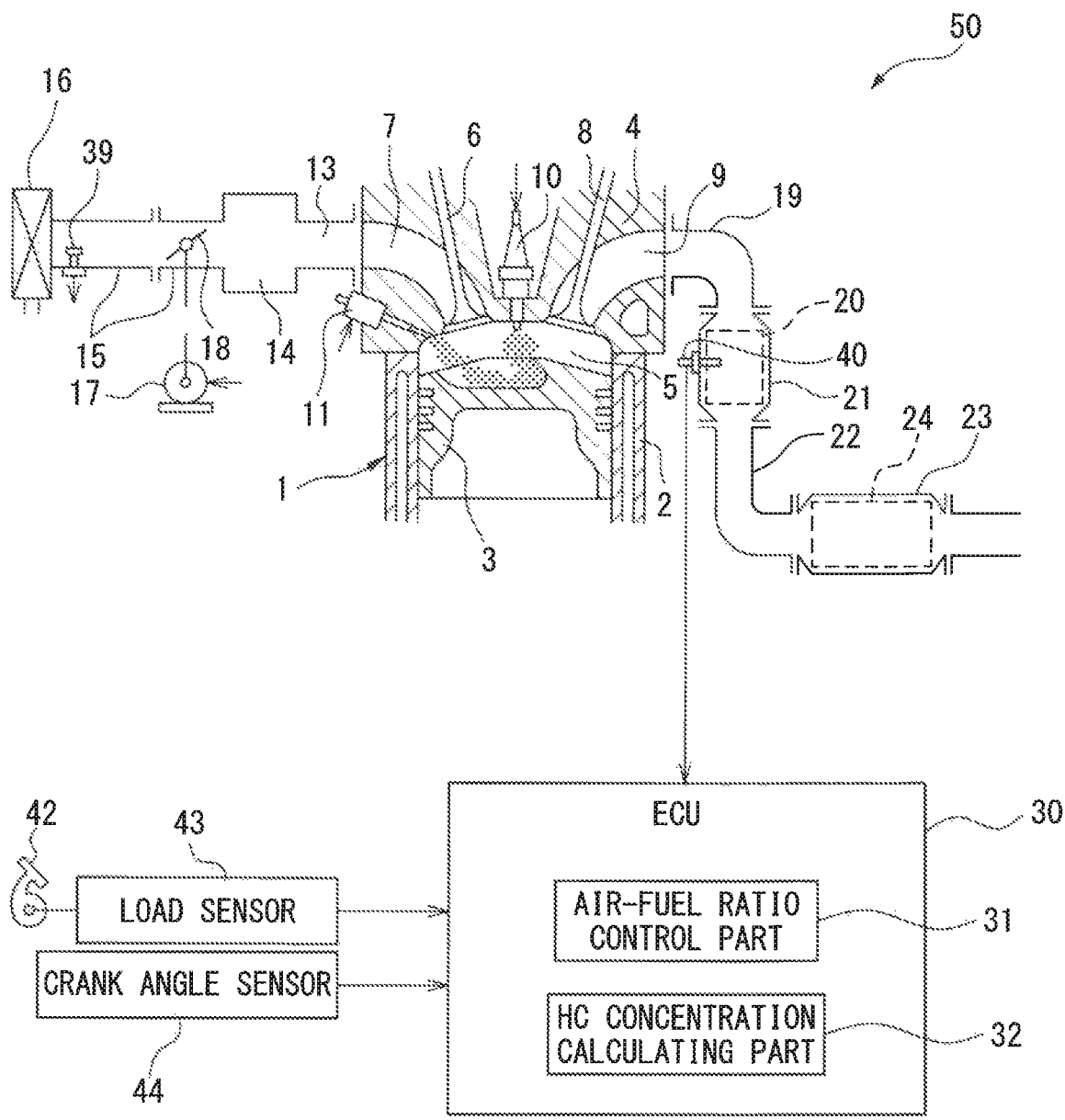
FIG. 1 is a view schematically showing an internal combustion engine in which an exhaust purification system of an internal combustion engine according to a first embodiment of the present invention is used.

Below, referring to the drawings, the exhaust purification system of an internal combustion engine and exhaust purification method in embodiments of the present invention will be explained in detail. Note that, in the following explanation, similar component elements are assigned the same reference notations.

First Embodiment

First, referring to FIG. 1 to FIG. 4, a first embodiment of the present invention will be explained.

Explanation of Internal Combustion Engine as a Whole

FIG. 1 is a view schematically showing an internal combustion engine 50 in which an exhaust purification system of an internal combustion engine according to a first embodiment of the present invention is used. The internal combustion engine 50 shown in FIG. 1 is a spark ignition type internal combustion engine (for example a gasoline engine). The internal combustion engine 50 is mounted in a vehicle.

The internal combustion engine 50 is provided with an engine body 1 including a cylinder block 2 and a cylinder head 4 fixed on die cylinder block 2. Inside the cylinder block 2, a piston 3 is arranged reciprocating inside each cylinder formed in the cylinder block 2. Between the piston 3 and the cylinder head 4, a combustion chamber 5 is formed in which an air-fuel mixture is burned.

The cylinder head 4 is formed with an intake port 7 and exhaust port 9. The intake port 7 and exhaust port 9 communicate with the combustion chamber 5. Further, the internal combustion engine is provided with an intake valve 6 find exhaust valve 8 arranged inside the cylinder head 4. The intake valve 6 opens and closes the intake port 7 while the exhaust valve 8 opens and closes the exhaust port 9.

Further, the internal combustion engine 50 is provided with a spark plug 10 arranged at the center part of the inside wall surface of the cylinder head 4 and a fuel injector 11 arranged at a peripheral part of the inside wall surface of the cylinder head 4. The spark plug 10 is configured so as to generate a spark in response to an ignition signal. Further, the fuel injector 11 injects a predetermined amount of fuel into the combustion chamber 5 in response to an injection signal. In the present embodiment, as fuel, gasoline with a stoichiometric air-fuel ratio of 14.6 is used.

Further, the internal combustion engine 50 is provided with an intake runner 13, surge tank 14, intake pipe 15, air cleaner 16, and throttle valve 18. The intake port 7 of each cylinder is connected to the surge tank 14 through a corresponding intake runner 13, while the surge tank 14 is connected through the intake pipe 15 to the air cleaner 16. The intake port 7, intake runner 13, surge tank 14, intake pipe 15, etc., form an intake passage guiding air to the combustion chamber 5. The throttle valve 18 is arranged between the surge tank 14 and air cleaner 16 in the intake pipe 15 and is driven by a throttle valve driving actuator 17. The throttle valve 18 can change the open area of the intake passage by being made to turn by the throttle valve driving actuator 17.

Further, the internal combustion engine 50 is provided with an exhaust manifold 19, exhaust pipe 22, adsorbent 20, and catalyst 24. The exhaust port 9 of each cylinder is connected to the exhaust manifold 19. The exhaust manifold 19 has a plurality of runners connected to the exhaust ports 9 and a header to which these runners are joined. The header of the exhaust manifold 19 is connected to an upstream side casing 21 housing the adsorbent 20. The upstream side easing 21 is connected through the exhaust pipe 22 to a downstream side casing 23 housing a catalyst 24. The exhaust port 9, exhaust manifold 19, upstream side casing 21, exhaust pipe 22, downstream side casing 23, etc., form an exhaust passage discharging exhaust gas generated by combustion of the air-fuel mixture in the combustion chamber 5.

The various control operations of the internal combustion engine 50 are performed by an electronic control unit (ECU) 30. The ECU 30 is a digital computer including a central processing unit (CPU), a memory such as a ROM and RAM, an input port, an output port, etc. The ECU 30 controls various types of actuators of the internal combustion engine 50 based on the outputs etc., of the various sensors of the internal combustion engine 50.

At the intake pipe 15, an air flow meter 39 is arranged for detecting the amount of flow of air through the inside of the intake pipe 15. The air flow meter 39 is electrically connected to the ECU 30. The output of the air flow meter 39 is input to the ECU 30. Further, at the adsorbent 20, an adsorbent temperature sensor 40 is arranged for detecting the temperature of the adsorbent 20. The adsorbent temperature sensor 40 is electrically connected to the ECU 30. The output of the adsorbent temperature sensor 40 is input to the ECU 30.

Further, at the accelerator pedal 42, a load sensor 43 is connected for generating an output voltage proportional to the amount of depression of the accelerator pedal 42. The load sensor 43 is electrically connected to the ECU 30. The output of the load sensor 43 is input to the ECU 30. The ECU 30 calculates the engine load based on the output of the load sensor 43.

Further, the internal combustion engine 50 is provided with a crank angle sensor 44. The crank angle sensor 44 for example generates an output pulse every time the crankshaft rotates by 15 degrees. The crank angle sensor 44 is electrically connected to the ECU 30. The output of the crank angle sensor 44 is input to the ECU 30. The ECU 30 calculates the engine speed based on the output of the crank angle sensor 44.

Further, the ECU 30 is electrically connected to the spark plug 10, the fuel injector 11, and the throttle valve drive actuator 17 and controls the same. Specifically, the ECU 30 controls the ignition timing of the spark plug 10, the injection timing and injection amount of the fuel injector 11, and the opening degree of the throttle valve 18.

Note that, the above-mentioned internal combustion engine is a nonsupercharging internal combustion engine using gasoline as fuel, but the configuration of the internal combustion engine is not limited to the above configuration. Therefore, the specific configuration of the internal combustion engine such as the cylinder array, mode of injection of fuel, configuration of intake and exhaust systems, configuration of valve operating mechanisms, and presence or absence of a supercharger may differ from the configuration shown in FIG. 1. For example, the fuel injector 11 may be arranged so as to inject fuel inside the intake port 7.

Exhaust Purification System of Internal Combustion Engine

Below, an exhaust purification system of an internal combustion engine (below, simply referred to as an "exhaust purification system") according to a first embodiment of the present invention will be explained.

The exhaust purification system is provided with an adsorbent 20 and catalyst 24. The adsorbent 20 includes an HC adsorbent arranged in the exhaust passage and adsorbing HC (hydrocarbons) in the exhaust gas and an NOx adsorbent arranged in the exhaust passage and adsorbing NOx (nitrogen oxides) in the exhaust gas. For this reason, the adsorbent 20 adsorbs the HC and NOx in the exhaust gas flowing through the exhaust passage. In the present embodiment, the HC adsorbent and NOx adsorbent are integrally formed and are housed in the same casing as the adsorbent 20. For example, the adsorbent 20 is a honeycomb adsorbent member comprised of a honeycomb carrier on the cell walls of which an adsorbent layer is formed.

The adsorbent 20 adsorbs HC and NOx and keeps the HC and NOx from flowing into the catalyst 24 when the temperature of the exhaust gas is low like at the time of cold start of the internal combustion engine 50. For this reason, by using the adsorbent 20 to adsorb HC and NOx, it is possible to keep the exhaust emissions from deteriorating when the temperature of the exhaust gas is low.

Specifically, when the temperature of the adsorbent 20 is less than the desorption temperature of HC, the adsorbent 20 adsorbs the HC in the exhaust gas flowing into the adsorbent 20. On the other hand, when the temperature of the adsorbent 20 is equal to or more than the desorption temperature of HC, the adsorbent 20 makes the HC adsorbed at the adsorbent 20 desorb. Note that, the "desorption temperature of HC" is the temperature when the desorption speed of HC becomes equal to or more than a predetermined value.

Further, when the temperature of the adsorbent 20 is less than the desorption temperature of NOx, the adsorbent 20 adsorbs the NOx in the exhaust gas flowing into the adsorbent 20. On the other hand, when the temperature of the adsorbent 20 is equal to or more than the desorption temperature of NOx, the adsorbent 20 makes the NOx adsorbed at the adsorbent 20 desorb. Note that, the "desorption temperature of NOx" is the temperature when the desorption speed of NOx becomes equal to or more than a predetermined value. Note that, the desorption temperature of HC and the desorption temperature of NOx are acquired by experiments in advance.

The catalyst 24 is arranged in the exhaust passage at the downstream side from the adsorbent 20 in the direction of exhaust flow and removes HC and NOx. The catalyst 24 is for example a three-way catalyst. Specifically, the catalyst 24 is comprised of a support made of a ceramic at which a precious metal having a catalytic action (for example, platinum (Pt)) and a promoter having an oxygen storing ability (for example, ceria ($CeO_2$)) are supported.

Figure 2:
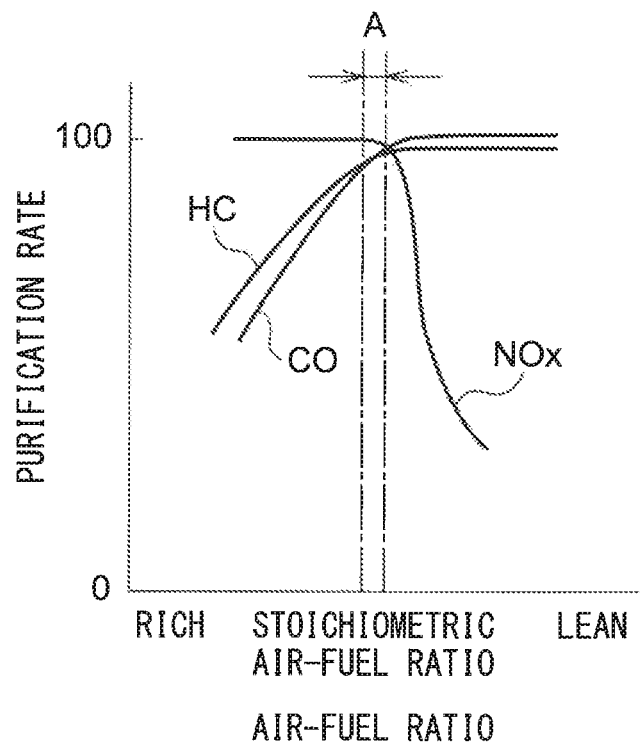
FIG. 2 shows the purification characteristics of a three-way catalyst.

FIG. 2 shows the purification characteristics of a three-way catalyst. As shown in FIG. 2, the purification rates of unburned gases (HC, CO) and NOx by the catalyst 24 become relatively high when the air-fuel ratio of the exhaust gas flowing into the catalyst 24 is in the region in the vicinity of the stoichiometric air-fuel ratio (purification window A in FIG. 2).

Further, the catalyst 24 stores or releases oxygen by the promoter in accordance with the air-fuel ratio of the exhaust gas. Specifically, the catalyst 24 stores excessive oxygen in the exhaust gas when the air-fuel ratio of the exhaust gas is leaner than the stoichiometric air-fuel ratio. On the other hand, the catalyst 24 releases an amount of oxygen corresponding to the amount insufficient for oxidizing the unburned gases when the air-fuel ratio of the exhaust gas is richer than the stoichiometric air-fuel ratio. As a result, even if the air-fuel ratio of the exhaust gas deviates somewhat from the stoichiometric air-fuel ratio, the air-fuel ratio on the surface of the catalyst 24 is maintained in the vicinity of the stoichiometric air-fuel ratio and the unburned gases and NOx in the catalyst 24 are effectively removed.

Further, the exhaust purification system is provided with an air-fuel ratio control part 31 and HC concentration calculating part 32. The air-fuel ratio control part 31 controls the air-fuel ratio of the exhaust gas. The HC concentration calculating part 32 calculates the concentration of HC desorbed from the adsorbent 20 (below, referred to as the "HC desorption concentration"). In the present embodiment, the ECU 30 functions as the air-fuel ratio control part 31 and HC concentration calculating part 32.

For example, the air-fuel ratio control part 31 controls the air-fuel ratio of the exhaust gas discharged from the engine body 1 of the internal combustion engine 50 (below, referred as the "engine exhaust gas"). Note that, the air-fuel ratio of the engine exhaust gas corresponds to the air-fuel ratio of the exhaust gas at the upstream side from the adsorbent 20 in the direction of exhaust flow.

Specifically, the air-fuel ratio control part 31 controls the fuel injection amount of the fuel injector 11 to thereby control the air-fuel ratio of the engine exhaust gas. The fuel injection amount FA is calculated by the following formula (1) based on the target air-fuel ratio TAF and the intake air amount IA. The intake air amount IA is detected by the air flow meter 39.

$$FA=IA/TAF \quad (1)$$

Note that, the air-fuel ratio control part 31 may control by feedback the fuel injection amount of the fuel injector 11 based on the output of an air-fuel ratio sensor arranged at the upstream side from the adsorbent 20 in the direction of exhaust flow in the exhaust passage. In this case, the air-fuel ratio control part 31 controls the fuel injection amount of the fuel injector 11 so that the air-fuel ratio detected by the air-fuel ratio sensor becomes the target air-fuel ratio.

As explained above, when the temperature of the adsorbent 20 is equal to or more than the desorption temperature of HC, the HC adsorbed at the adsorbent 20 is desorbed. On the other hand, when the temperature of the adsorbent 20 is equal to or more than the desorption temperature of NOx, the NOx adsorbed at the adsorbent 20 is desorbed. The HC and NOx desorbed from the adsorbent 20 flow into the catalyst 24 together with the exhaust gas.

Figure 3:
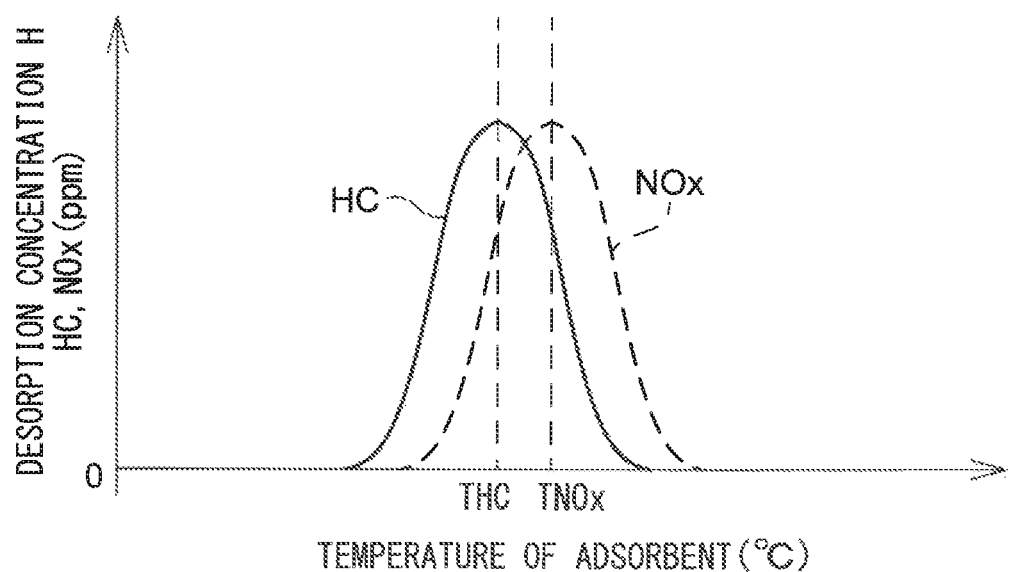
FIG. 3 is a graph showing the desorption concentrations of HC and NOx when making the temperature of the adsorbent adsorbing predetermined amounts of HC and NOx rise.

FIG. 3 is a graph showing the desorption concentrations of HC and NOx when making the temperature of the adsorbent 20 at which predetermined amounts of HC and NOx are adsorbed rise. In FIG. 3, the desorption concentration is shown by the solid line, while the concentration of NOx desorbed from the adsorbent 20 (below, referred to as the "NOx desorption concentration") is shown by the broken line.

In the present embodiment, as shown in FIG. 3, in the adsorbent 20, the peak THC of the desorption temperature of HG and the peak TNOx of the desorption temperature of NOx are substantially the same. In other words, the adsorbent 20, that is, the HC adsorbent and NOx adsorbent, is configured so that the peak THC of the desorption temperature of HC and the peak TNOx of the desorption temperature of NOx become substantially the same.

Note that, the "peak THC of the desorption temperature of HC" means the temperature of the adsorbent 20 when the ITC desorption concentration becomes maximum. Similarly, the peak TNOx of the desorption temperature of NOx means the temperature of the adsorbent 20 when the NOx desorption concentration becomes maximum. Further, in this Description, the peak THC of the desorption temperature of HC and the peak TNOx of the desorption temperature of NOx being "substantially the same" means the difference between the peaks (TNOx-THC in FIG. 3) is within 20° C.

For this reason, in the present embodiment, when the internal combustion engine 50 is warmed up and the temperature of the exhaust gas rises, HC and NOx substantially simultaneously are desorbed from the adsorbent 20 and flow into the catalyst 24. At this time, as will be understood from FIG. 2, the catalyst 24 can effectively remove the BC and NOx at the stoichiometric air-fuel ratio (in the present embodiment, 14.6).

However, if HC is desorbed from the adsorbent 20, even if the air-fuel ratio of the engine exhaust gas is controlled to the stoichiometric air-fuel ratio, the air-fuel ratio of the exhaust gas flowing into the catalyst (below, referred to as the "inflowing exhaust gas") becomes richer than the stoichiometric air-fuel ratio due to the HC. At this time, the rich degree of the air-fuel ratio of the inflowing exhaust gas (the difference from the stoichiometric air-fuel ratio) changes in accordance with the HC desorption concentration.

Therefore, in the present embodiment, the air-fuel ratio control part 31 controls the air-fuel ratio of the inflowing exhaust gas to the stoichiometric air-fuel ratio based on the HC desorption concentration calculated by the HC concentration calculating part 32 when HC is desorbed from the adsorbent 20. By doing this, even during desorption of HC, the air-fuel ratio at the catalyst 24 can be made the stoichiometric air-fuel ratio and in turn the exhaust emissions can be kept from deteriorating when HC and NOx flow out from the adsorbent 20.

Air-Fuel Ratio Control

Figure 4:
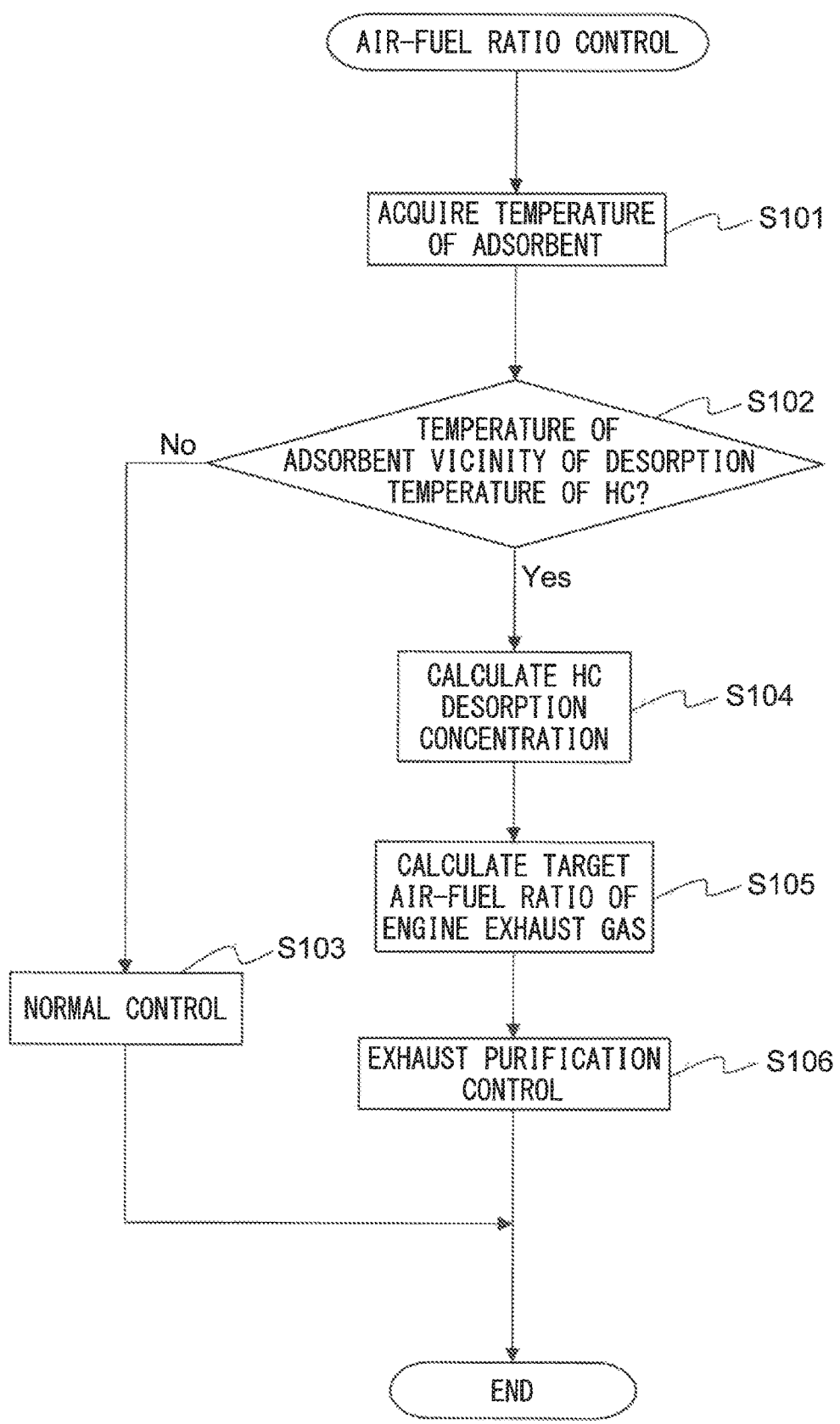
FIG. 4 is a flow chart showing a control routine of air-fuel ratio control in the first embodiment.

Below, referring to the flow chart of FIG. 4, the air-fuel ratio control for removing HC and NOx in the present embodiment will be explained. FIG. 4 is a flow chart showing the control routine of air-fuel ratio control in the first embodiment. The present control routine is repeatedly performed by the ECU 30 at predetermined intervals.

First, at step S101, the air-fuel ratio control part 31 acquires the temperature of the adsorbent 20. For example, the air-fuel ratio control part 31 calculates the temperature of the adsorbent 20 based on the output of the adsorbent temperature sensor 40. In this case, the temperature of the adsorbent 20 is detected by the adsorbent temperature sensor 40. Note that, the adsorbent temperature sensor 40 may be arranged at the upstream side of the adsorbent 20 in the direction of exhaust flow in the exhaust passage and detect the temperature of the exhaust gas flowing into the adsorbent 20. Further, the air-fuel ratio control part 31 may calculate the temperature of the adsorbent 20 based on the operating state of the internal combustion engine 50 (amount of intake air etc). In this case, the adsorbent temperature sensor 40 may be omitted.

Next, at step S102, the air-fuel ratio control part 31 judges whether the temperature of the adsorbent 20 is the vicinity of the desorption temperature of HC. The vicinity of the desorption temperature of HC is predetermined and for example is set to a temperature region where the difference from the desorption temperature of HC is within a predetermined value. Further, the vicinity of the desorption temperature of HC may be set to a temperature region between the desorption temperature of HC and a predetermined temperature higher than the desorption temperature of HC.

If at step S102 it is judged that the temperature of the adsorbent 20 is not the vicinity of the desorption temperature of HC, the present control routine proceeds to step S103. The air-fuel ratio control part 31 performs usual control. Specifically, the air-fuel ratio control part 31 controls the air-fuel ratio of the engine exhaust gas to the target air-fuel ratio (for example, the stoichiometric air fuel ratio) in accordance with the operating state of the internal combustion engine 50. After step S103, the present control routine ends.

On the other hand, if at step S102 it is judged that the temperature of the adsorbent 20 is the vicinity of the desorption temperature of HC, the present control routine proceeds to step S104. At step S104, the HC concentration calculating part 32 calculates the HC desorption concentration $D_c$ by the following formula (2):

$$D_c = v_{dH}/(v_{ex}+v_{dH}) \quad (2)$$

Here, $v_{dH}$ is the desorption speed of HC, and $v_{ex}$ is the flow rate of the exhaust gas. The flow rate $v_{ex}$ of exhaust gas is calculated by a known method using a flow rate sensor, calculation formula, or map. Further, the HC concentration calculating part 32 for example calculates the desorption speed of HC by the following formula (3):

$$v_{dH} = A_{dH} \cdot \exp(-E_{dH}(1-C_H\theta)/RT)\cdot\theta\cdot\varphi \quad (3)$$

Here, R is a gas constant, $A_{dH}$ is a frequency factor, $E_{dH}$ is an activation energy, $\varphi$ is a site density, and $C_H$ is a correction coefficient. The frequency factor $A_{dH}$, activation energy $E_{dH}$, site density φ, and correction coefficient $C_H$ are determined in advance by experiments etc. Further, T is the site temperature of the adsorbent 20. Further, θ is the site adsorption rate (0 to 1) and for example is calculated by dividing the current amount of adsorption by the maximum amount of adsorption.

Note that, the HC concentration calculating part 32 may use a map prepared in advance so as to calculate the desorption speed $v_{dH}$ of HC based on the temperature T of the adsorbent and the site adsorption rate θ.

Next, at step S105, the air-fuel ratio control part 31 calculates the target air-fuel ratio of the engine exhaust gas so that the air-fuel ratio of the inflowing exhaust gas becomes the stoichiometric air-fuel ratio based on the HC desorption concentration calculated by the HC concentration calculating part 32. Specifically, the air-fuel ratio control part 31 calculates the target air-fuel ratio TAF of the engine exhaust gas by the following formula (4):

$$TAF = AF_{st} + \Delta AF \quad (4)$$

Here, $AF_{st}$ is the stoichiometric air-fuel ratio (in the present embodiment, 14.6). Further, ΔAF is the difference between the air-fuel ratio $AF_{en}$ of the engine exhaust gas and the air-fuel ratio $AF_{ct}$ of the inflowing exhaust gas ($\Delta AF = AF_{en} - AF_{et}$). The air-fuel ratio is for example calculated by the following formula (5) and (6):

$$AF = (a/(P_{CO} + P_{co2} + P_{HC})) \cdot (1 - P_{H2O} - bP_{CO} + cP_{co2} - P_{HC}) \quad (5)$$

$$P_{H2O} = d \cdot r \cdot (P_{CO} + P_{co2})/(1 + P_{CO}/(e \cdot P_{co2}) + d \cdot r \cdot (P_{CO} + P_{co2})) \quad (6)$$

Here, "a", "b", "c", "d", and "e" are predetermined constants. Further, "r" is the atomic number ratio of H and C (H/C) in the fuel. Further, $P_{CO}$ is the CO concentration in the exhaust gas, $P_{co2}$ is the $CO_2$ concentration in the exhaust gas, $P_{HC}$ is the HC concentration in the exhaust gas, and $P_{H2O}$ is the $H_2O$ concentration in the exhaust gas. The CO concentration, $CO_2$ concentration, and HC concentration in the engine exhaust gas are calculated by a known method using a sensor, calculation formula, or map. Further, the $H_2O$ concentration in the engine exhaust gas is calculated by the above formula (6).

If the air-fuel ratio $AF_{en}$ of the engine exhaust gas is calculated, in the above formulas (5) and (6), the CO concentration, $CO_2$ concentration, and HC concentration in the engine exhaust gas are used. On the other hand, if the air-fuel ratio $AF_{ct}$ of the inflowing exhaust gas is calculated, in the above formulas (5) and (6), the CO concentration, $CO_2$ concentration, and HC concentration in the inflowing exhaust gas are used. The CO concentration and $CO_2$ concentration in the in lowing exhaust gas are the same as the CO concentration and $CO_2$ concentration in the engine exhaust gas. However, the inflowing exhaust gas contains HC desorbed from the adsorbent 20. For this reason, the HC concentration in the inflowing exhaust gas is calculated by adding the HC desorption concentration calculated at step S104 to the HC concentration in the engine exhaust gas (HC concentration in inflowing exhaust gas=HC concentration in engine exhaust gas+HC desorption concentration).

Next, at step S106, the air-fuel ratio control part 31 performs exhaust purification control for removing the HC and NOx. Specifically, the air-fuel ratio control part 31 controls the amount of fuel injection of the fuel injector 11 so that the air-fuel ratio of the engine exhaust gas becomes the target air-fuel ratio. After step S106, the present control routine ends.

Second Embodiment

The exhaust purification system and exhaust purification method of an internal combustion engine in a second embodiment are basically the same as the exhaust purification system and exhaust purification method of an internal combustion engine in the first embodiment except for the points explained below. For this reason, below, the parts in the second embodiment of the present invention different from the first embodiment will be focused on in the explanation.

Figure 5:
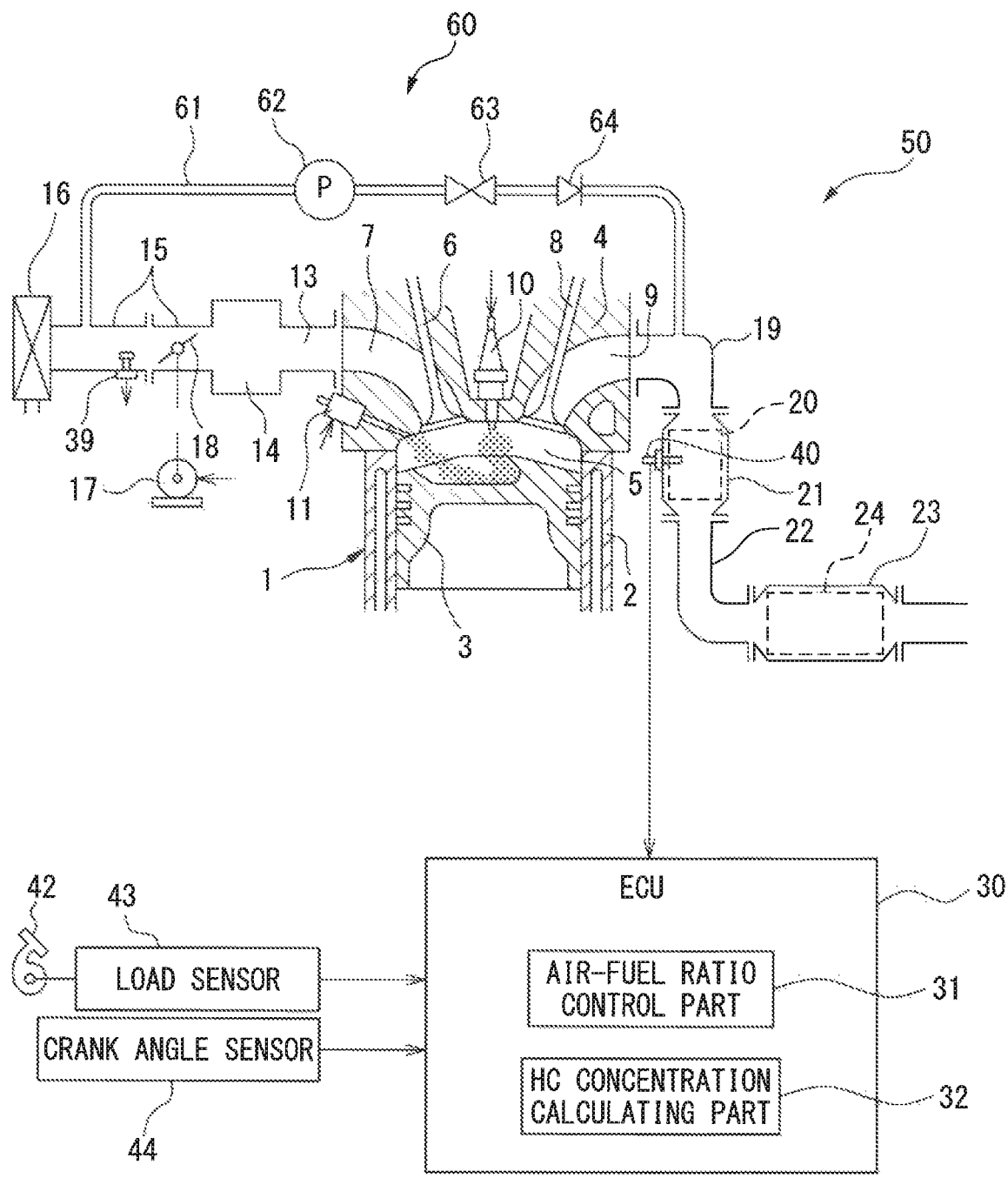
FIG. 5 is a view schematically showing an internal combustion engine in which an exhaust purification system of an internal combustion engine according to a second embodiment of the present invention is used.

FIG. 5 is a view schematically showing an internal combustion engine 50' in which an exhaust purification system of an internal combustion engine according to the second embodiment of the present invention is used in the second embodiment, the internal combustion engine 50' is further provided with an air feed device 60 feeding air to the exhaust passage at the upstream side from the catalyst 24 in the direction of exhaust flow. The air feed device 60 includes an air feed passage 61, air pump 62, air switching valve 63, and check valve 64. The air pump 62, air switching valve 63, and check valve 64 are arranged in the air feed passage 61.

The air feed passage 61 connects the intake passage and the exhaust passage. Specifically, the air feed passage 61 connects the intake pipe 15 and the exhaust manifold 19. The air pump 62 is driven by an electric motor and pressurizes air inside the intake passage to feed it to the exhaust manifold 19. The air switching valve 63 opens and closes the air feed passage 61. A cheek valve 64 prevents the backflow of air from the exhaust passage to the intake passage.

The air pump 62 and air switching valve 63 are electrically connected to the ECU 30 and controlled by the ECU 30. When air is supplied to the exhaust passage by the air feed device 60, the air switching valve 63 is opened and the air pump 62 is driven. As a result, a part of the air passing through the air cleaner 16 passes through the air supply passage 61 and is fed to the exhaust passage. The air feed device 60 is a so-called secondary air feed device. Note that, the feed source of air may be other than the intake passage.

In the second embodiment, the air-fuel ratio control part 31 uses the air feed device 60 to control the air-fuel ratio of the inflowing exhaust gas to the stoichiometric air-fuel ratio based on the HC desorption concentration calculated by the ITC concentration calculating part 32. By doing this, it is possible to more precisely control the air-fuel ratio of the inflowing exhaust gas. Further, even if the internal combustion engine 50' stops, it is possible to use the air feed device 60 to feed air to the exhaust passage to thereby make the air-fuel ratio of the inflowing exhaust gas the stoichiometric air-fuel ratio and effectively remove HC and NOx desorbed from the adsorbent 20.

Air-Fuel Ratio Control

Figure 6:
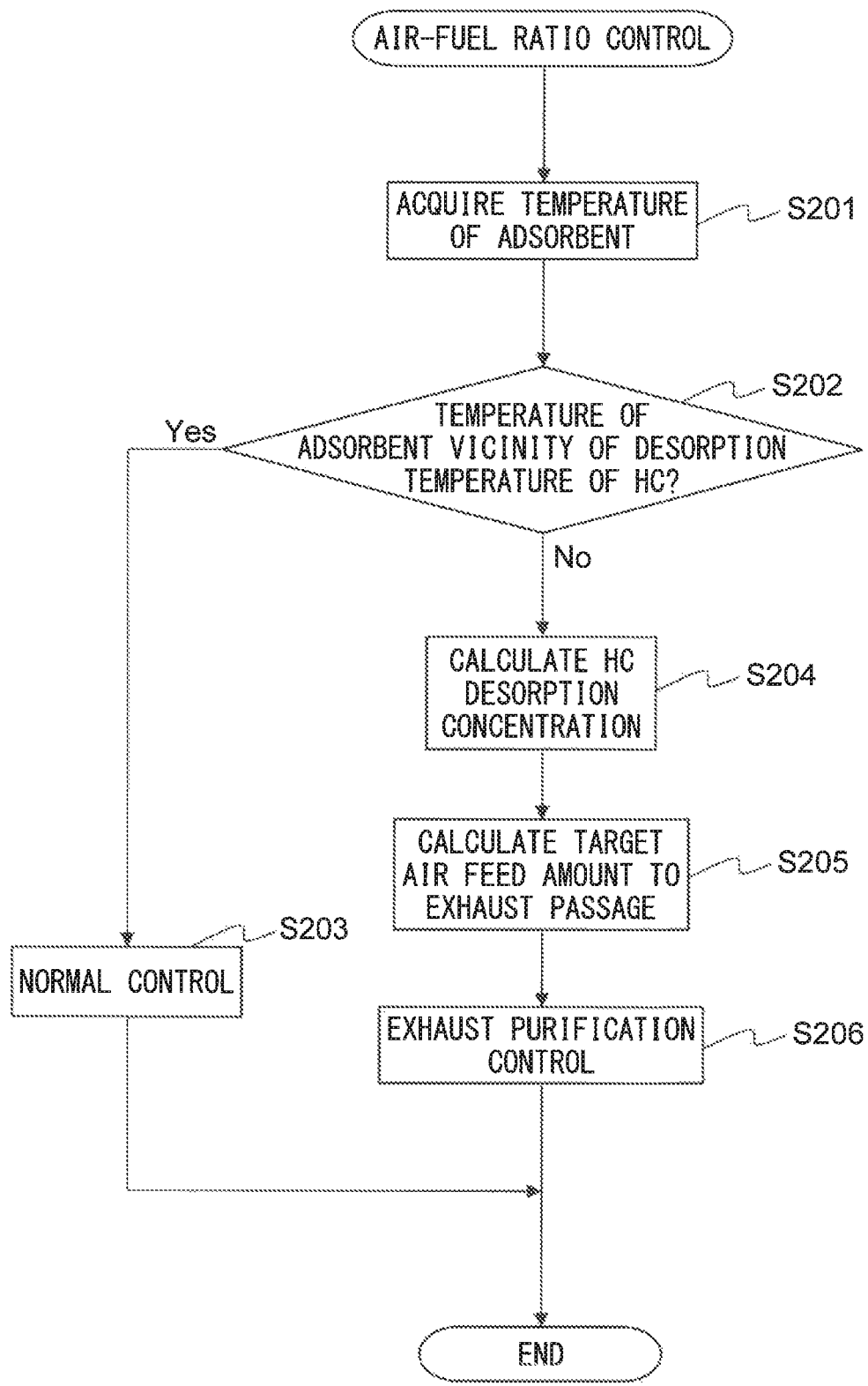
FIG. 6 is a flow chart showing a control routine of air-fuel ratio control in the second embodiment.

Below, referring to the flow chart of FIG. 6, the air-fuel ratio control for removing HC and NOx in the present embodiment will be explained. FIG. 6 is a flow chart showing the control routine of air-fuel ratio control in the second embodiment. The present control routine is repeatedly performed by the ECU 30 at predetermined intervals.

Step S201 to step S204 are performed in the same way as step S101 to step S104 of FIG. 4. In the present control routine, after step S204, at step S205, the air-fuel ratio control part 31 calculates the target amount of feed of air to the exhaust passage so that the air-fuel ratio of the inflowing exhaust gas becomes the stoichiometric air-fuel ratio based on the HC desorption concentration calculated by the HC concentration calculating part 32.

Next, at step S206, the air-fuel ratio control part 31 performs exhaust purification control. Specifically, the air-fuel ratio control part 31 controls the air feed device 60 so that the amount of feed of air from the air feed device 60 to the exhaust passage becomes a target air feed amount. Specifically, the air-fuel ratio control part 31 controls the amount of discharge of the air pump 62 so as to control the air feed amount. After step S206, the present control routine ends.

Third Embodiment

The exhaust purification system and exhaust purification method of an internal combustion engine in a third embodiment are basically the same as the exhaust purification system and exhaust purification method of an internal combustion engine in the first embodiment except for the points explained below. For this reason, below, the parts in the third embodiment of the present invention different from the first embodiment will be focused on in the explanation.

Figure 7:
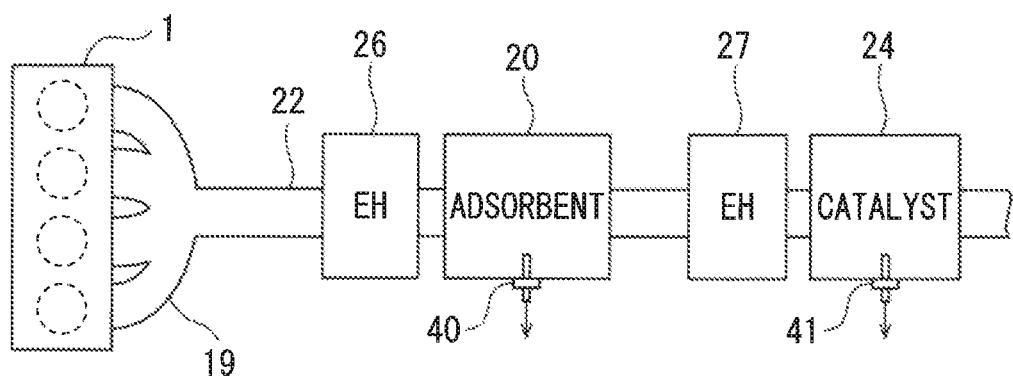
FIG. 7 is a view schematically showing an exhaust passage of an internal combustion engine in which an exhaust purification system of an internal combustion engine according to a third embodiment of the present invention is used.

FIG. 7 is a view schematically showing the exhaust passage of an internal combustion engine in which an exhaust purification system of an internal combustion engine according to the third embodiment of the present invention is used. In the third embodiment, the exhaust purification system is further provided with an adsorbent heating device 26 for heating the adsorbent 20 and a catalyst heating device 27 for heating the catalyst 24. The adsorbent heating device 26 is arranged in the exhaust passage at the upstream side from the adsorbent 20 in the direction of exhaust flow. The catalyst heating device 27 is arranged in the exhaust passage between the adsorbent 20 and the catalyst 24.

Note that, the adsorbent heating device 26 may be integral with the adsorbent 20. For example, the adsorbent heating device 26 and the adsorbent 20 may be housed in the same casing. Further, the catalyst heating device 27 may be integral with the catalyst 24. For example, the catalyst heating device 27 and the catalyst 24 may be housed in the same casing.

Further, at the adsorbent 20, the adsorbent temperature sensor 40 is arranged for detecting the temperature of the adsorbent 20. The adsorbent temperature sensor 40 is electrically connected to the ECU 30. The output of the adsorbent temperature sensor 40 is input to the ECU 30. Further, at the catalyst 24, a catalyst temperature sensor 41 is arranged for detecting the temperature of the catalyst 24. The catalyst temperature sensor 41 is electrically connected to the ECU 30. The output of the catalyst temperature sensor 41 is input to the ECU 30.

Note that, the adsorbent temperature sensor 40 may be arranged in the exhaust passage between the adsorbent heating device 26 and the adsorbent 20 and detect the temperature of the exhaust gas flowing into the adsorbent 20. Further, the catalyst temperature sensor 41 may be arranged in the exhaust passage between the catalyst heating device 27 and the catalyst 24 and detect the temperature of the exhaust gas flowing into the catalyst 24.

Figure 8:
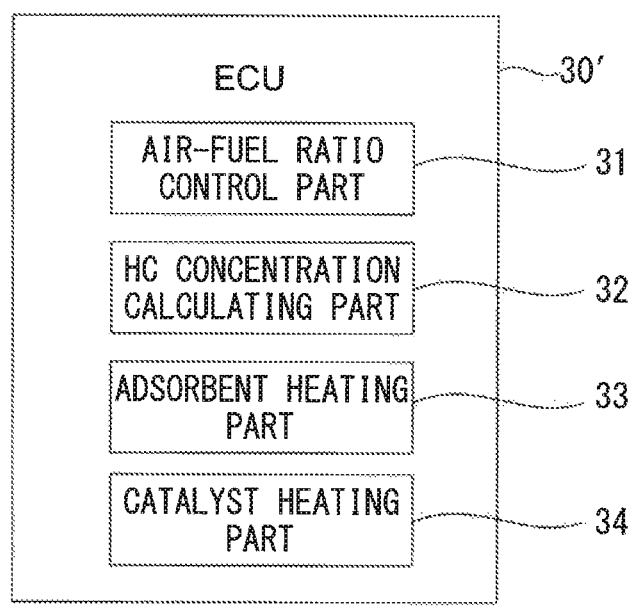
FIG. 8 is a view schematically showing the configuration of an ECU in the third embodiment of the present invention.

FIG. 8 is a view schematically showing the configuration of the ECU 30' in the third embodiment of the present invention. The exhaust purification system is further provided with an adsorbent heating part 33 for controlling the adsorbent heating device 26 and a catalyst heating part 34 for controlling the catalyst heating device 27. In the third embodiment, the ECU 30' functions as the air-fuel ratio control part 31, HC concentration calculating part 32, adsorbent heating part 33, and catalyst heating part 34.

The adsorbent heating part 33 controls the adsorbent heating device 26 so that the temperature of the adsorbent 20 becomes the desired temperature. The adsorbent heating device 26 is for example an electric heater. In this case, the adsorbent heating part 33 controls the amount of current supplied to the adsorbent heating device 26. Note that, the adsorbent heating device 26 may be a burner. In this case, the adsorbent heating part 33 for example controls the amount of air fed to the adsorbent heating device 26.

The catalyst heating part 34 controls the catalyst heating device 27 so that the temperature of the catalyst 24 becomes a desired temperature. The catalyst heating device 27 is for example an electric heater. In this case, the catalyst heating part 34 controls the amount of current supplied to the catalyst heating device 27. The temperature of the adsorbent 20 and the temperature of the catalyst 24 are controlled mutually independently. Note that, the catalyst heating device 27 may be a burner. In this case, the catalyst heating part 34 for example controls the amount of air fed to the catalyst heating device 27.

The adsorbent heating part 33 maintains the temperature of the adsorbent 20 at the vicinity of the desorption temperature of HC by the adsorbent heating device 26 when the air-fuel ratio control part 31 controls the air-flow ratio of the inflowing exhaust gas to the stoichiometric air-fuel ratio based on the HC desorption concentration calculated by the HC concentration calculating part 32. By doing this, it is possible to keep the HC desorption concentration from fluctuating and possible to keep the precision of calculation of the HC desorption concentration from dropping. Therefore, it is possible to keep the air-fuel ratio of the inflowing exhaust gas from deviating from the stoichiometric air-fuel ratio when HC and NOx are desorbed from the adsorbent 20. Further, it is possible to cause HC and NOx to be desorbed from the adsorbent 20 to remove the HC and NOx at a desired timing.

Further, if the amount of adsorption of HC is small and the amount of adsorption of NOx is large, mainly NOx is supplied from the adsorbent 20 to the catalyst 24. In this case, the catalyst 24 can effectively remove the NOx at the stoichiometric air-fuel ratio. Further, if the amount of adsorption of HC is small, the air-fuel ratio of the inflowing exhaust gas becomes the same as the air-fuel ratio of the engine exhaust gas. For this reason, if the amount of adsorption of HC at the adsorbent 20 is equal to or less than a predetermined HC reference amount and the amount of adsorption of NOx at the adsorbent 20 is greater than a predetermined NOx reference amount, the air-fuel ratio control part 31 controls the air-fuel ratio of the engine exhaust gas to the stoichiometric air-fuel ratio. By doing this, when mainly NOx is desorbed from the adsorbent 20 it is possible to effectively remove NOx at the catalyst 24.

On the other hand, if the amount of adsorption of HC is large and the amount of adsorption of NOx is small, mainly HC is supplied from the adsorbent 20 to the catalyst 24. In this case, by supplying the catalyst 24 with oxygen reacting with the HC together with the HC, it is possible to effectively remove the HC. For this reason, if the amount of adsorption of HC at the adsorbent 20 is greater than a predetermined HC reference amount and the amount of adsorption of NOx at the adsorbent 20 is equal to or less than a predetermined NOx reference amount, the air-fuel ratio control part 31 controls the air-fuel ratio of the engine exhaust gas to be leaner than the stoichiometric air-fuel ratio. By doing this, when mainly HC is desorbed from the adsorbent 20, it is possible to effectively remove HC at the catalyst 24.

Air-Fuel Ratio Control

Figure 9A:
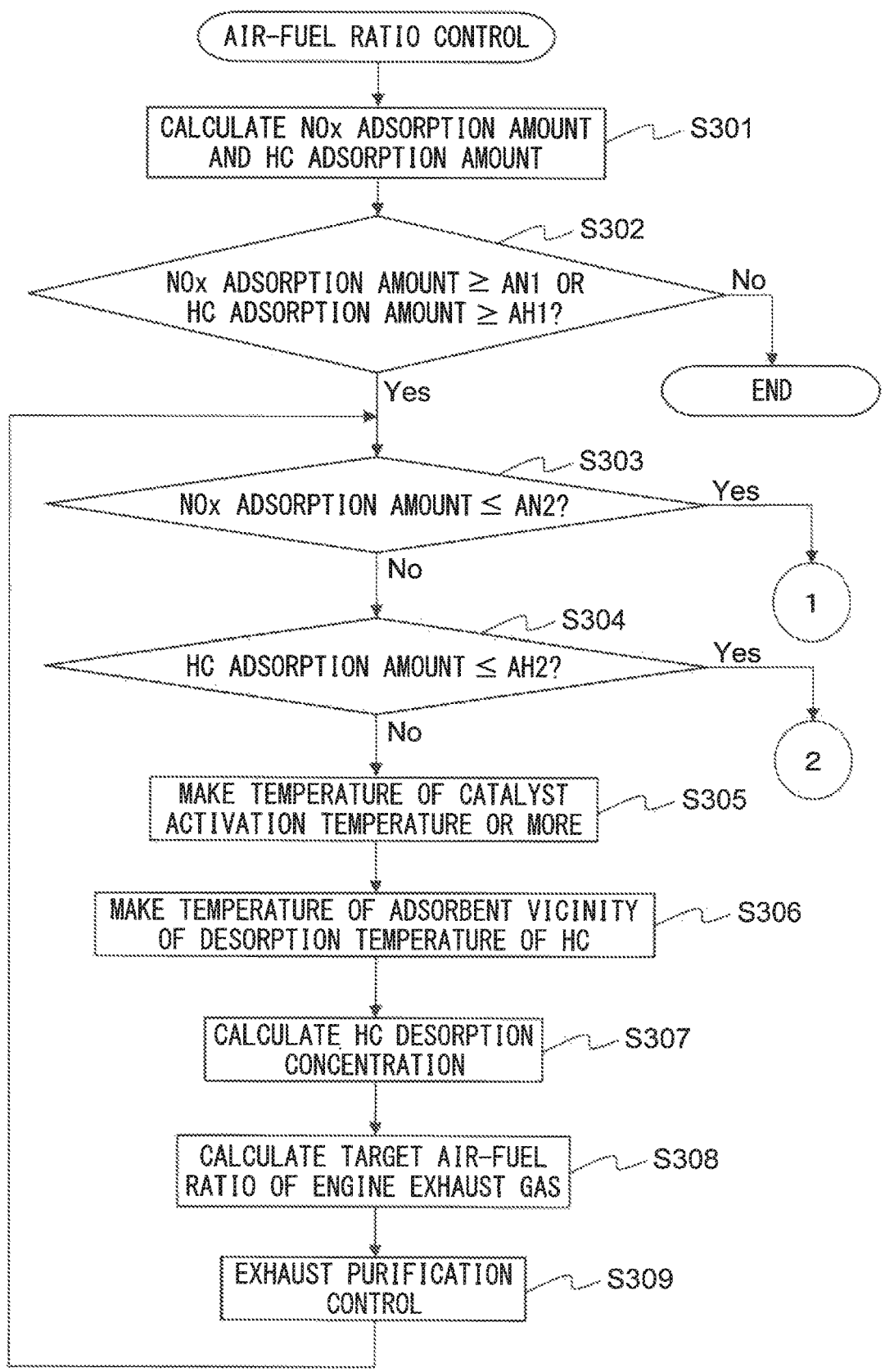
FIG. 9A is a flow chart showing a control routine of air-fuel ratio control in the third embodiment.
Figure 9B:
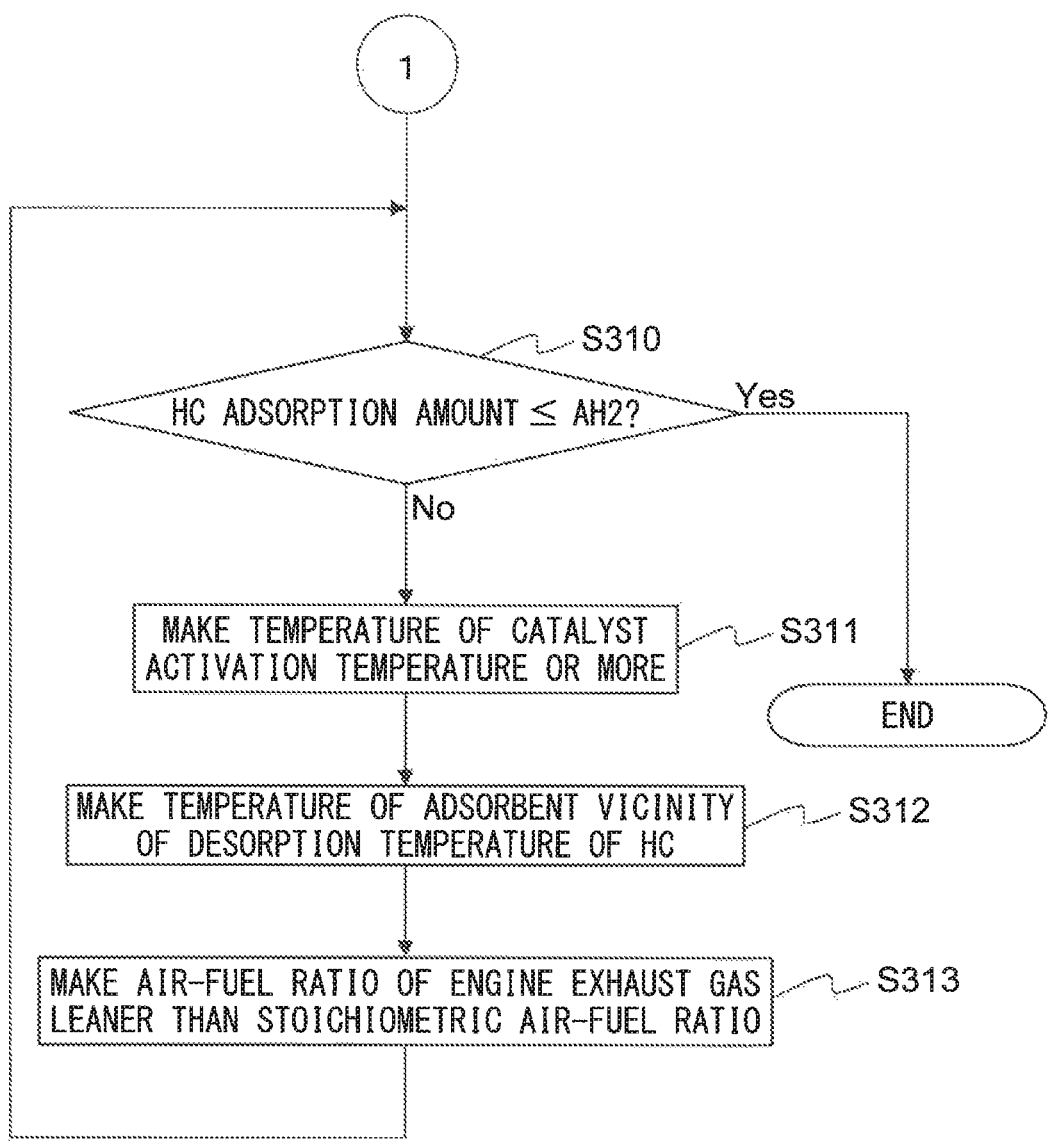
FIG. 9B is a flow chart showing a control routine of air-fuel ratio control in the third embodiment.
Figure 9C:
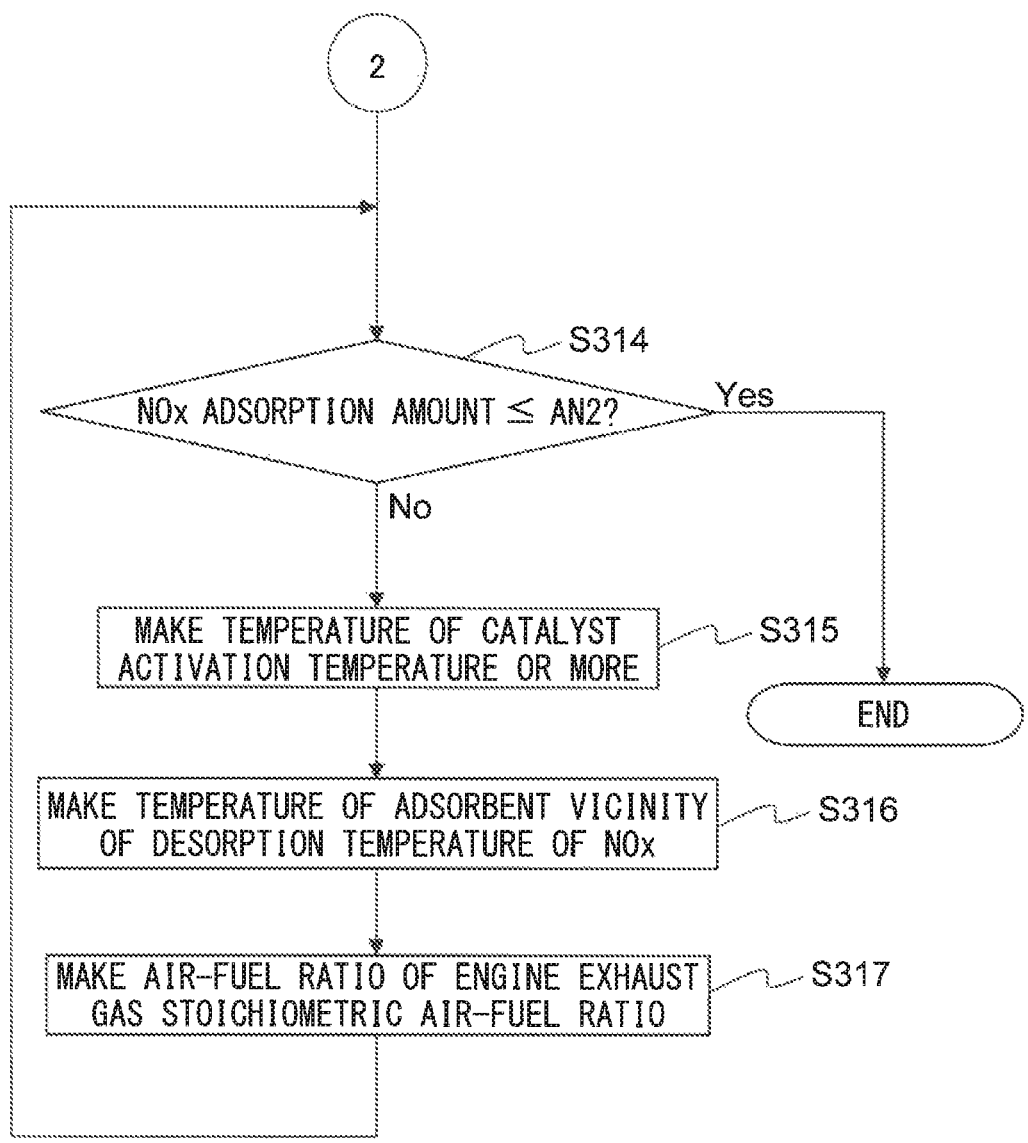
FIG. 9C is a flow chart showing a control routine of air-fuel ratio control in the third embodiment.

FIG. 9A to FIG. 9C are flow charts showing the control routine for air-fuel ratio control in the third embodiment. The present control routine is repeatedly performed by the ECU 30' at predetermined intervals.

First, at step S301, the air-fuel ratio control part 31 calculates the amount of adsorption of NOx at the adsorbent 20 and the amount of adsorption of HC at the adsorbent 20. For example, the air-fuel ratio control part 31, as shown in the following formula (7), calculates the amount of adsorption M by time integration of the adsorption speed $v_a$ minus the desorption speed $v_d$.

$$M=\int(v_a-v_d)dt \tag{7}$$

For example, the air-fuel ratio control part 31 calculates the adsorption speed $v_a$ by the following formula (8) and calculates the desorption speed $v_d$, by the inflowing formula (9).

$$v_a=A_a \cdot \exp(-E_a/RT) \cdot P \cdot (1-\theta) \cdot \varphi \tag{8}$$

$$v_d=A_d \cdot \exp(-E_d(1-C \cdot \theta)/RT) \cdot \theta \cdot \varphi \tag{9}$$

Here, R is the gas constant while $A_a$ and $A_d$ are frequency factors, $E_a$ and $E_d$ are activation energies, $\varphi$ is the site density, and C is a correction coefficient. The frequency factors $A_a$, $A_d$, activation energies $E_a$, $E_d$ site density $\varphi$, and correction coefficient C are determined in advance for HC and NOx by experiments etc. Further, T is the temperature of the adsorbent 20. Further, $\theta$ is the site adsorption rate (0 to 1) and for example is calculated by dividing the current amount of adsorption by the maximum amount of adsorption.

Further, P the concentration of the adsorbable substance (NOx or HC) in the exhaust gas and is calculated by a known method using an NOx concentration sensor, HC concentration sensor, air-fuel ratio sensor calculation formula or map. When the amount of adsorption of NOx is calculated, the concentration of NOx in the exhaust gas is entered for P of the above formula (8) so as to calculate the adsorption speed of NOx. On the other hand, when the amount of adsorption of HC is calculated, the concentration of HC in the exhaust gas is entered for P of the above formula (8) so as to calculate the adsorption speed of HC.

Note that, the air-fuel ratio control part 31 may use a map prepared in advance so as to calculate the adsorption speed $v_a$ based on the temperature T of the adsorbent, the site adsorption rate $\theta$, and the concentration P of the adsorbable substance in the exhaust gas. Similarly, the air-fuel ratio control part 31 may use a map prepared in advance so as to calculate the desorption speed $v_d$ based on the temperature T of the adsorbent and the site adsorption rate $\theta$.

Next, at step S302, the air-fuel ratio control part 31 judges whether the amount of adsorption of NOx is equal to or more than a first NOx reference amount AN1 or the amount of adsorption of HC is equal to or more than a first reference amount AH1. The first NOx reference amount AN1 is predetermined and is set to a value less than the maximum amount of adsorption of NOx in the adsorbent 20. The first HC reference amount AH1 is predetermined and is set to a value less than the maximum amount of adsorption of HC in the adsorbent 20.

If at step S302 it is judged that the amount of adsorption of NOx is less than the first NOx reference amount AN1 and the amount of adsorption of HC is less than the first HC reference amount AH1, the present control routine ends. On the other hand, if at step S202 it is judged that the amount of adsorption of NOx is equal to or more than the first NOx reference amount AN1 or the amount of adsorption of HC is equal to or more than the first HC reference amount AH1, the present control routine proceeds to step S303.

At step S303, the air-fuel ratio control part 31 judges whether the amount of adsorption of NOx is equal to or less than a second NOx reference amount AN2. The second NOx reference amount AN2 is predetermined and is set to a value less than the first NOx reference amount AN1. For example, the second NOx reference amount AN2 is set to a value of ⅕ or less of the maximum amount of adsorption of NOx at the adsorbent 20. If at step S303 it is judged that the amount of adsorption of NOx is greater than the second NOx reference amount AN2, the present control routine proceeds to step S304.

At step S304, the air-fuel ratio control part 31 judges whether the amount of adsorption of HC is equal to or less than a second HC reference amount AH2. The second HC reference amount AH2 is predetermined and is set to a value less than the first HC reference amount AH1. For example, the second HC reference amount AH2 is set to a value of ⅕ or less of the maximum amount of adsorption of HC at the adsorbent 20. If at step S304 it is judged that the amount of adsorption of HC is greater than the second HC reference amount AH2, the present control routine proceeds to step S305.

At step S305, the catalyst heating part 34 controls the catalyst heating device 27 to thereby make the temperature of the catalyst 24 the activation temperature or more. The activation temperature is predetermined. Specifically, the catalyst heating part 34 controls the catalyst heating device 27 by feedback so that the temperature of the catalyst 24 detected by the catalyst temperature sensor 41 becomes the activation temperature or more. Note that, the catalyst heating part 34 may calculate the temperature of the catalyst 24 based on the operating state of the internal combustion engine 50 (the amount of intake air etc.), the amount of current supplied to the catalyst heating device 27, etc., and control the catalyst heating device 27 by feedback so that the calculated temperature of the catalyst 24 becomes the activation temperature or more. In this case, the catalyst temperature sensor 41 may be omitted.

Next, at step S306, the adsorbent heating part 33 controls the adsorbent heating device 26 to make the temperature of the adsorbent 20 the vicinity of the desorption temperature of HC. Specifically, the adsorbent heating part 33 controls the adsorbent heating device 26 by feedback so that the temperature of the adsorbent 20 detected by the adsorbent temperature sensor 40 becomes the vicinity of the desorption temperature of HC. Note that, the adsorbent heating part 33 may calculate the temperature of the adsorbent 20 based on the operating state of the internal combustion engine 50 (amount of intake air etc.), amount of current supplied to the adsorbent 20, etc., and control the adsorbent heating device 26 by feedback so that the calculated temperature of the adsorbent 20 becomes the vicinity of the desorption temperature of HC. In this case, the adsorbent temperature sensor 40 may be omitted.

Next, step S307 to step S309 are performed in the same way as step S104 to step S106 of FIG. 4 whereby HC and NOx are removed.

The present control routine returns to step S303 after step S309. Until the amount of adsorption of NOx falls and reaches the second NOx reference amount AN2 or until the amount of adsorption of HC falls and reaches the second HC reference amount AH2, step S303 to step S309 are repeatedly executed. Note that, the amount of adsorption of NOx and the amount of adsorption of HC are updated by the above formula (7).

If at step S303 it is judged that the amount of adsorption of NOx is equal to or less than the second NOx reference amount AN2, the present control routine proceeds to step S310. At step S310, the air-fuel ratio control part 31 judges whether the amount of adsorption of HC is equal to or less than the second HC reference amount AH2. If it is judged that the amount of adsorption of HC is greater than the second HC reference amount AH2, the present control routine proceeds to step S311.

At step S311, in the same way as step S305, the catalyst heating part 34 controls the catalyst heating device 27 to make the temperature of the catalyst 24 the activation temperature or more. Next, at step S312, in the same way as step S306, the adsorbent heating part 33 controls the adsorbent heating device 26 to make the temperature of the adsorbent 20 the vicinity of the desorption temperature of HC.

Next, at step S313, the air-fuel ratio control part 31 performs HC removal control. Specifically, the air-fuel ratio control part 31 makes the air-fuel ratio of the engine exhaust gas leaner than the stoichiometric air-fuel ratio.

For example, the air-fuel ratio control part 31 performs fuel cut control in which it stops the supply of fuel to the combustion chamber 5 of the internal combustion engine 50 to thereby make the air-fuel ratio of the engine exhaust gas leaner than the stoichiometric air-fuel ratio. If fuel cut control is performed, the engine exhaust gas becomes air and the air flows into the catalyst 24. For this reason, it is possible to effectively remove HC by the oxygen in the air without discharging NOx.

Note that, fuel cut control is performed when predetermined conditions are satisfied. The predetermined conditions are satisfied, for example, when the amount of depression of the accelerator pedal 42 is zero or substantially zero (that is, the engine load is zero or substantially zero) and the engine speed is equal to or more than a predetermined speed higher than the speed at the time of idling. When at step S313 the predetermined conditions are not satisfied, the air-fuel ratio control part 31 may reduce the amount of fuel with respect to the amount of intake air to thereby make the air-fuel ratio of the engine exhaust gas leaner than the stoichiometric air-fuel ratio.

The present control routine returns to step S310 after step S313. After that, until the amount of adsorption of HC falls and reaches the second HC reference amount AH2, step S310 to step S313 are repeatedly executed. Note that, the amount of adsorption of HC is updated by the above formula (7). If at step S310 it is judged that the amount of adsorption of HC is equal to or less than the second HC reference amount AH2, the present control routine ends.

Further, if at step S304 it is judged that the amount of adsorption of HC is equal to or less than the second HC reference amount AH2, the present control routine proceeds to step S314. At step S314, the air-fuel ratio control part 31 judges whether the amount of adsorption of NOx is equal to or less than the second NOx reference amount AN2. If it is judged that the amount of adsorption of NOx is greater than the second NOx reference amount AN2, the present control routine proceeds to step S315.

At step S315, in the same way as step S305, the catalyst heating part 34 controls the catalyst heating device 27 to make the temperature of the catalyst 24 the activation temperature or more. Next, at step S316, the adsorbent heating part 33 controls the adsorbent heating device 26 to make the temperature of the adsorbent 20 the vicinity of the desorption temperature of NOx.

The vicinity of the desorption temperature of NOx is predetermined and for example is set to a temperature region where the difference from the desorption temperature of NOx is within a predetermined value. Further, the vicinity of the desorption temperature of NOx may be set to a temperature region between the desorption temperature of NOx and a predetermined temperature higher than the desorption temperature of NOx. Further, in the present embodiment, at the adsorbent 20, the peak THC of the desorption temperature of HC and the peak TNOx of the desorption temperature of NOx are substantially the same, so the vicinity of the desorption temperature of NOx may be set to the same temperature region as the vicinity of the desorption temperature of HC.

Next, at step S317, the air-fuel ratio control part 31 performs NOx removal control. Specifically, the air-fuel ratio control part 31 makes the air-fuel ratio of the engine exhaust gas the stoichiometric air-fuel ratio.

The present control routine returns to step S314 after step S317. After that, until the amount of adsorption of NOx falls and reaches the second NOx reference amount AN2, step S314 to step S317 are repeatedly performed. Note that, the amount of adsorption of NOx is updated by the above formula (7). If at step S314 it is judged that the amount of adsorption of NOx is equal to or less than the second NOx reference amount AN2, the present control routine ends.

Note that, step S305 and step S311 may be omitted.

Further, if the vehicle at which the internal combustion engine 50 is provided is a hybrid vehicle and the internal combustion engine 50 is started by a motor, the air-fuel ratio control part 31 may use the motor to start of the internal combustion engine 50 and thereby make the air-fuel ratio of the engine exhaust gas leaner than the stoichiometric air-fuel ratio. That is, the air-fuel ratio control part 31 may use so-called "motoring" to make the air-fuel ratio of the engine exhaust gas leaner than the stoichiometric air-fuel ratio.

If motoring is performed, the engine exhaust gas becomes air and the air flows into the catalyst 24. For this reason, it is possible to effectively remove HC by the oxygen in the air without discharging NOx. Further, at this time, at the hybrid vehicle, drive use power is output by the motor, so even if the vehicle is being driven, motoring can be used to effectively remove HC. Furthermore, even when the vehicle is stopped, motoring can be used to effectively remove HC.

Other Embodiments

Above, preferred embodiments according to the present invention were explained, but the present invention is not limited to these embodiments and can be corrected and changed in various ways within the language of the claims. For example, if the temperature difference between the HC adsorbent and NOx adsorbent is small, the HC adsorbent and the NOx adsorbent may be separate members. For example, the HC adsorbent and the NOx adsorbent may be housed in separate casings. In this case, in the second embodiment, the HC adsorbent heating device for heating the HC adsorbent and the NOx adsorbent heating device for heating the NOx adsorbent may be separately provided.

Further, the catalyst 24 may remove HC and NOx at a predetermined air-fuel ratio and the air-fuel ratio control part 31 may control the air-fuel ratio of the inflowing exhaust gas to the above predetermined air-fuel ratio based on the HC desorption concentration calculated by the HC concentration calculating part 32 when HC is desorbed from the HC adsorbent. That is, the catalyst 24 may be a catalyst other than a three-way catalyst.

In this case, at step S105 of FIG. 4 and step S308 of FIG. 9A, the air-fuel ratio control part 31 calculates the target air-fuel ratio of the engine exhaust gas so that the air-fuel ratio of the inflowing exhaust gas becomes the above predetermined air-fuel ratio based on the HC desorption concentration calculated by the HC concentration calculating part 32. Further, at step S205 of FIG. 6, the air-fuel ratio control part 31 calculates the target amount of feed of air to the exhaust passage so that air-fuel ratio of the inflowing exhaust gas becomes the above air-fuel ratio based on the HC desorption concentration calculated by the HC concentration calculating part 32.

Further, the internal combustion engine 50 may be a diesel engine. Further, the adsorbent 20 may be integral with the catalyst 24. For example, the adsorbent 20 and the catalyst 24 may be housed in the same casing.

Further, the above-mentioned embodiments can be worked freely combined. For example, the second embodiment and the third embodiment may be combined and, instead of step S308 and step S309 of FIG. 9A, step S205 and step S206 of FIG. 6 may be performed.

REFERENCE SIGNS LIST

20. adsorbent
24. catalyst
30. ECU
31. air-fuel ratio control part
32. HC concentration calculating part

The invention claimed is:

1. An exhaust purification system of an internal combustion engine comprising
   an HC adsorbent arranged in an exhaust passage of an internal combustion engine and adsorbing HC in exhaust gas,
   an NOx adsorbent arranged in the exhaust passage and adsorbing NOx in exhaust gas,
   a catalyst arranged in the exhaust passage at a downstream side from the HC adsorbent and the NOx adsorbent in a direction of exhaust flow and removing HC and NOx at a predetermined air-fuel ratio,
   an air-fuel ratio control part configured to control an air-fuel ratio of exhaust gas, and
   an HC concentration calculating part configured to calculate a concentration of HC desorbed from the HC adsorbent, wherein
   a peak of a desorption temperature of HC at the HC adsorbent and a peak of a desorption temperature of NOx at the NOx adsorbent are substantially the same, and
   the air-fuel ratio control part is configured to control an air-fuel ratio of inflowing exhaust gas flowing into the catalyst to the predetermined air-fuel ratio based on the concentration of HC calculated by the HC concentration calculating part when HC is desorbed from the HC adsorbent.

2. The exhaust purification system of an internal combustion engine according to claim 1, further comprising
   an adsorbent heating device heating the HC adsorbent and an adsorbent heating part configured to control the adsorbent heating device, wherein
   the adsorbent heating part is configured to maintain a temperature of the HC adsorbent at a vicinity of the desorption temperature of HC by the adsorbent heating device when the air-fuel ratio control part controls the air-fuel ratio of exhaust gas to the predetermined air-fuel ratio based on the concentration of HC calculated by the HC concentration calculating part.

3. The exhaust purification system of an internal combustion engine according to claim 2, further comprising an air feed device feeding air to the exhaust passage at an upstream side from the catalyst in the direction of exhaust flow,
   the air-fuel ratio control part is configured to use the air-feed device to control the air-fuel ratio of inflowing exhaust gas to the predetermined air-fuel ratio based on the concentration of HC calculated by the HC concentration calculating part.

4. The exhaust purification system of an internal combustion engine according to claim 3, wherein
   the catalyst is a three-way catalyst, and
   the air-fuel ratio control part is configured to control an air-fuel ratio of exhaust gas exhausted from an engine body of the internal combustion engine to a stoichiometric air-fuel ratio when an amount of adsorption of HC at the HC adsorbent is equal to or less than a predetermined HC reference amount and an amount of adsorption of NOx at the NOx adsorbent is greater than a predetermined NOx reference amount.

5. The exhaust purification system of an internal combustion engine according to claim 4, wherein
   the air-fuel ratio control part is configured to control an air-fuel ratio of exhaust gas exhausted from an engine body of the internal combustion engine to leaner than the stoichiometric air-fuel ratio when the amount of adsorption of HC at the HC adsorbent is greater than the predetermined HC reference amount and the amount of adsorption of NOx at the NOx adsorbent is equal to or less than the predetermined NOx reference amount.

6. The exhaust purification system of an internal combustion engine according to claim 3, wherein
   the catalyst is a three-way catalyst, and
   the air-fuel ratio control part is configured to control an air-fuel ratio of exhaust gas exhausted from an engine body of the internal combustion engine to leaner than a stoichiometric air-fuel ratio when an amount of adsorption of HC at the HC adsorbent is greater than a predetermined HC reference amount and an amount of adsorption of NOx at the NOx adsorbent is equal to or less than a predetermined NOx reference amount.

7. The exhaust purification system of an internal combustion engine according to claim 2, wherein
   the catalyst is a three-way catalyst, and
   the air-fuel ratio control part is configured to control an air-fuel ratio of exhaust gas exhausted from an engine body of the internal combustion engine to a stoichiometric air-fuel ratio when an amount of adsorption of HC at the HC adsorbent is equal to or less than a predetermined HC reference amount and an amount of adsorption of NOx at the NOx adsorbent is greater than a predetermined NOx reference amount.

8. The exhaust purification system of an internal combustion engine according to claim 7, wherein
   the air-fuel ratio control part is configured to control an air-fuel ratio of exhaust gas exhausted from an engine body of the internal combustion engine to leaner than the stoichiometric air-fuel ratio when the amount of adsorption of HC at the HC adsorbent is greater than the predetermined HC reference amount and the amount of adsorption of NOx at the NOx adsorbent is equal to or less than the predetermined NOx reference amount.

9. The exhaust purification system of an internal combustion engine according to claim 2, wherein
the catalyst is a three-way catalyst, and
the air-fuel ratio control part is configured to control an air-fuel ratio of exhaust gas exhausted from an engine body of the internal combustion engine to leaner than a stoichiometric air-fuel ratio when an amount of adsorption of HC at the HC adsorbent is greater than a predetermined HC reference amount and an amount of adsorption of NOx at the NOx adsorbent is equal to or less than a predetermined NOx reference amount.

10. The exhaust purification system of an internal combustion engine according to claim 1, further comprising an air feed device feeding air to the exhaust passage at an upstream side from the catalyst in the direction of exhaust flow,
the air-fuel ratio control part is configured to use the air-feed device to control the air-fuel ratio of inflowing exhaust gas to the predetermined air-fuel ratio based on the concentration of HC calculated by the HC concentration calculating part.

11. The exhaust purification system of an internal combustion engine according to claim 10, wherein
the catalyst is a three-way catalyst, and
the air-fuel ratio control part is configured to control an air-fuel ratio of exhaust gas exhausted from an engine body of the internal combustion engine to a stoichiometric air-fuel ratio when an amount of adsorption of HC at the HC adsorbent is equal to or less than a predetermined HC reference amount and an amount of adsorption of NOx at the NOx adsorbent is greater than a predetermined NOx reference amount.

12. The exhaust purification system of an internal combustion engine according to claim 11, wherein
the air-fuel ratio control part is configured to control an air-fuel ratio of exhaust gas exhausted from an engine body of the internal combustion engine to leaner than the stoichiometric air-fuel ratio when the amount of adsorption of HC at the HC adsorbent is greater than the predetermined HC reference amount and the amount of adsorption of NOx at the NOx adsorbent is equal to or less than the predetermined NOx reference amount.

13. The exhaust purification system of an internal combustion engine according to claim 10, wherein
the catalyst is a three-way catalyst, and
the air-fuel ratio control part is configured to control an air-fuel ratio of exhaust gas exhausted from an engine body of the internal combustion engine to leaner than a stoichiometric air-fuel ratio when an amount of adsorption of HC at the HC adsorbent is greater than a predetermined HC reference amount and an amount of adsorption of NOx at the NOx adsorbent is equal to or less than a predetermined NOx reference amount.

14. The exhaust purification system of an internal combustion engine according to claim 1, wherein
the catalyst is a three-way catalyst, and
the air-fuel ratio control part is configured to control an air-fuel ratio of exhaust gas exhausted from an engine body of the internal combustion engine to a stoichiometric air-fuel ratio when an amount of adsorption of HC at the HC adsorbent is equal to or less than a predetermined HC reference amount and an amount of adsorption of NOx at the NOx adsorbent is greater than a predetermined NOx reference amount.

15. The exhaust purification system of an internal combustion engine according to claim 14, wherein
the air-fuel ratio control part is configured to control an air-fuel ratio of exhaust gas exhausted from an engine body of the internal combustion engine to leaner than the stoichiometric air-fuel ratio when the amount of adsorption of HC at the HC adsorbent is greater than the predetermined HC reference amount and the amount of adsorption of NOx at the NOx adsorbent is equal to or less than the predetermined NOx reference amount.

16. The exhaust purification system of an internal combustion engine according to claim 1, wherein
the catalyst is a three-way catalyst, and
the air-fuel ratio control part is configured to control an air-fuel ratio of exhaust gas exhausted from an engine body of the internal combustion engine to leaner than a stoichiometric air-fuel ratio when an amount of adsorption of HC at the HC adsorbent is greater than a predetermined HC reference amount and an amount of adsorption of NOx at the NOx adsorbent is equal to or less than a predetermined NOx reference amount.

17. An exhaust purification method using an HC adsorbent arranged in an exhaust passage of an internal combustion engine and adsorbing HC in exhaust gas, an NOx adsorbent arranged in the exhaust passage and adsorbing NOx in exhaust gas, and a catalyst arranged in the exhaust passage at a downstream side from the HC adsorbent and the NOx adsorbent in a direction of exhaust flow and removing HC and NOx at a predetermined air-fuel ratio, comprising
controlling an air-fuel ratio of exhaust gas flowing into the catalyst to the predetermined air-fuel ratio based on a concentration of HC desorbed from the HC adsorbent when HC is desorbed from the HC adsorbent, wherein
a peak of a desorption temperature of HC at the HC adsorbent and a peak of a desorption temperature of NOx at the NOx adsorbent are substantially the same.

18. An exhaust purification system of an internal combustion engine comprising
an HC adsorbent arranged in an exhaust passage of an internal combustion engine and adsorbing HC in exhaust gas,
an NOx adsorbent arranged in the exhaust passage and adsorbing NOx in exhaust gas,
a catalyst arranged in the exhaust passage at a downstream side from the HC adsorbent and the NOx adsorbent in a direction of exhaust flow and removing HC and NOx at a predetermined air-fuel ratio, and
a control device, wherein
the control device is configured to control an air-fuel ratio of exhaust gas and calculate a concentration of HC desorbed from the HC adsorbent,
a peak of a desorption temperature of HC at the HC adsorbent and a peak of a desorption temperature of NOx at the NOx adsorbent are substantially the same, and
the control device is configured to control an air-fuel ratio of inflowing exhaust gas flowing into the catalyst to the predetermined air-fuel ratio based on the concentration of HC when HC is desorbed from the HC adsorbent.

* * * * *